Figure 1:
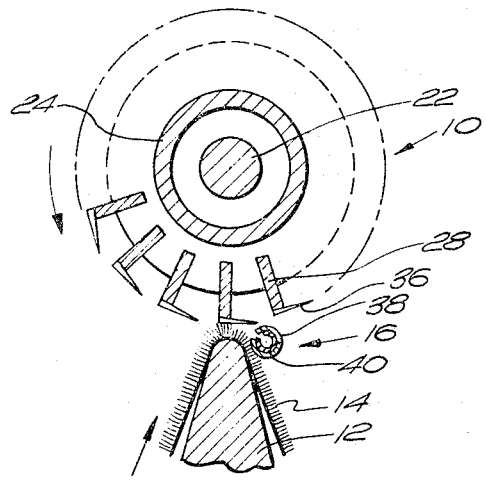

June 27, 1967 W. J. HOLM 3,327,366
APPARATUS FOR SHEARING FABRICS
Filed Oct. 19, 1965

INVENTOR
WILLIAM J. HOLM
BY
Morss, Altman & Oates
ATTORNEYS

United States Patent Office 3,327,366
Patented June 27, 1967

3,327,366
APPARATUS FOR SHEARING FABRICS
William J. Holm, Springfield, Vt., assignor to Parks & Woolson Machine Company, Springfield, Vt., a corporation of Vermont
Filed Oct. 19, 1965, Ser. No. 497,774
1 Claim. (Cl. 26—15)

This invention relates generally to the manufacture of fabrics and more particularly is directed towards a novel method and associated apparatus for shearing fibres projecting from a cloth surface.

In the manufacture of fabrics both woven and knit, it is the practice to pass the web in open width form through a shearing machine. The shearing mechanism typically comprises a cloth rest over which the fabric is advanced, a fixed ledger knife extending in closely spaced relation across the surface of the fabric and a revolving shearing head which co-acts with the ledger knife to shear the upstanding fibres on the fabric to a uniform height.

The presence of a ledger knife in a cloth shearing machine presents certain problems. For example, the ledger knife must be kept sharp and precisely positioned in order to co-act properly with the revolving shearing head. Also the knife must be lubricated and this may result in spotting of the fabric. Furthermore, existing shearing mechanisms have not been entirely effective in shearing all of the extra length fibres to a uniform length. This is due to the tendency of some of the fibres to bend over against the fabric and out of shearing position when the fabric moves over the shearing line.

Accordingly, it is an object of the present invention to provide improvements in methods and equipment used in the shearing of fibres extending from the surface of a running fabric.

Another object of this invention is to provide an improved method for raising all of the fibres on a fabric surface into an upstanding position to be shorn when passed against shearing elements.

A further object of this invention is to provide an improved fabric shearing mechanism capable of shearing fibres with a revolving shearing head as the sole cutting device without the use of a ledger knife.

Yet another object of this invention is to provide improvements in shearing revolvers.

More particularly this invention features the method of shearing fibres on the surface of a fabric, comprising the steps of passing the fabric in open width form around a relatively sharp turn and directing a jet of compressed air tangentially across the width of the fabric and against the direction of fabric movement to raise the fibres while simultaneously shearing the fibres along the line of contact of the air with the fabric. This method also includes the step of forming another air flow inwardly of the cutter so as to cooperate with the air jet to provide a continuing and substantial air flow tangentially against the fabric and inwardly into the cutter whereby the fibres will be raised to the maximum extent substantially perpendicular to the plane of the fabric for maximum shearing action.

This invention also features a knifeless shearing mechanism comprising in combination an air draft revolving cutter provided with spaced shearing elements, a rest over which the fabric is moved in opened width relation and an air jet system positioned adjacent the revolving cutter and the rest above the fabric surface and adapted to form a sheet of compressed air directed tangentially against the fabric moving over the rest towards the air draft revolver to effectively raise all of the fibres in the fabric.

This invention also includes a shearing revolver head comprising a rotatable cylindrical support provided with radially extending ribs formed helically about the outer cylindrical surface of the revolver. Individual cutting elements are detachably mounted on each of the helical ribs and extend forwardly of each of the ribs at substantially right angles thereof. The leading edge of each cutting element is sharpened as to form a scythe type cutter for shearing the fibres raised by the sheet of air.

Figure 2:
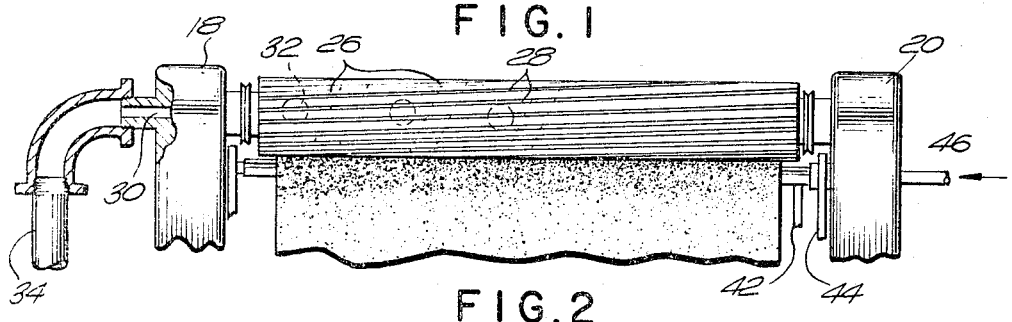
Figure 3:
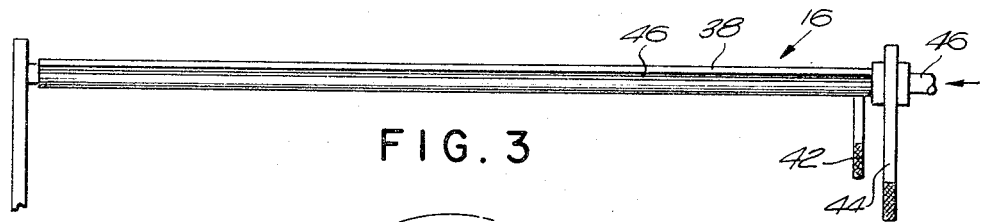
Figure 4:
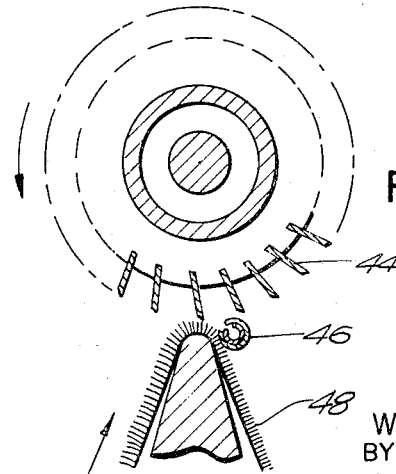

However, these and other features of the invention, along with further objects and advantages thereof, will become more fully apparent from the following detailed description of preferred embodiments of the invention, with reference being made to the accompanying drawings, in which:

FIG. 1 is a sectional view in side elevation of a fabric shearing mechanism made according to the invention, FIG. 2 is a front elevation thereof, FIG. 3 is a front elevation of the air jet mechanism, and, FIG. 4 is a view similar to FIG. 1 but showing a modification of the invention.

Referring now to the drawings and to FIGS. 1, 2 and 3 in particular, the reference character 10 generally indicates an air draft revolver of the sort disclosed in U.S. Patent No. 3,008,212. The revolver is mounted in close proximity to a cloth rest 12 over which a fabric web 14 is advanced in the direction indicated by the arrow. Mounted rearwardly of the rest near the top thereof, and below the revolver 10 is an air jet device 16 extending the full width of the web 14 and adapted to direct a continuous sheet of compressed air tangentially against the surface of the fabric 14 as it moves over the crest of the rest 12.

The air draft revolver 10 includes two side members 18 and 20 of the frame of the cloth shearing machine and a fixed shaft 22 between the frame members 18 and 20. As illustrated in FIG. 2 the tubular member 24 is grooved annularly at spaced areas therealong to provide a plurality of annular risers 26 and spaced annular channels between the risers. The risers and channels are in planes inclined between the longitudinal axis of the tubular member 24 and a radius thereto as indicated in FIG. 2. The risers are then slotted to receive ribs 28 which are anchored securely within the slots, the slots and ribs preferably being disposed helically about the members. The slots are of a depth to give adequate support to the ribs and space the ribs from the bottoms of the channels. The member 24 is supported at its ends for rotation by bearings and carries two driving pulleys respectively at its ends.

The risers 26 upon rotation of the member 24 effect a back and forth axial churning of the air in the channels which substantially increases the fibre lifting air draft. It will be understood that the inclined risers cause the fibre lifting air draft and the shearing function to continue uniformly along the entire length of the rotary shearing member.

For an even better air draft effect, an axial port 30 is provided in communication with the interior of the member 24 which is provided with spaced radial openings 32.

The port 30 is connected by a tube 34 to a vacuum exhausting source whereby air may be drawn outwardly from the port 30 and inwardly through the openings 32 located between the risers 26. The arrangement is such as to produce an in-draft of air up from the fabric towards the shearing member effective to raise the fibres into a shearing position where they will be shorn by means of cutting elements 36. These elements are detachably connected to the outer ends of the ribs 28 and extend forwardly therefrom in the direction of rotation generally tangential to the periphery of the revolver.

The detachable cutters 36 preferably are made of a high hardness steel having a limited lateral flexibility to permit pre-sharpened strip metal to be cut to length from a long section and then drilled and assembled onto the ribs in a quick and easy fashion. Each cutter lies on its supporting rib generally tangentially of the shearing revolver with its cutting edges extending forwardly of the rib so as to shear the upstanding fibres in a lopping action, the cut being made at a right angle to the fibres.

In order that all of the fibres in the web will be raised and held as stiffly erect as possible for the shearing operation along the shearing line and also to eliminate the conventional ledger knife, a jet of air in sheet form is directed from the air jet device 16 into the bite between the revolver and the web as it moves over the rest 12.

The air jet device 16 in the illustrated embodiment comprises a pair of concentric slit tubes 38 and 40. Both tubes are slit lengthwise to define restricted openings through which compressed air may flow in a sheet form upwardly against the surface of the fabric and tangentially thereto as it moves over the rest. In order to provide means for directing the sheet of air to its most effective position and also to control the air flow, the two slit tubes are mounted for angular adjustment about their longitudinal axes as by levers 42 and 44. In practice the inner slit tube 40 is connected by a conduit 46 to a source of compressed air. By rotating either one or both of the slit tubes, the sheet of air may be cut off entirely by covering the slit of the inner tube with a solid portion of the outer tube. Alternatively, the air flow may be increased by opening the slit tubes to their full extent by completely uncovering the slit along the inner tube. By selectively adjusting the two tubes, the amount and direction of the air flow may be carefully controlled to an optimum performance according to the particular material being shorn.

By employing the air draft revolver 10 in combination with the air jet device 16, all of the fibres on the fabric surface will be raised into a cutting position along the shearing line at the apex of the cloth rest. The flow of air out of the air jet device and into the air draft revolver is extremely effective in raising the fibres into an upstanding position and holding them stiffly erect while they are cut by the cutting elements in a lopping type shearing action.

While the cutting elements have been illustrated in FIG. 1 as being oriented for shearing the fibres in the direction of movement of the fabric, satisfactory shearing results are obtainable by mounting the blades to face in the opposite direction and reversing the rotation of the revolver so as to shear against the moving cloth. In either event, the fibres are raised into an upstanding position by means of the air jet source in combination with the air draft revolver.

In FIG. 4 there is illustrated a modification of the invention and in this embodiment a rotary shearing revolver, similar in construction to the revolver 10 of the principal embodiment, is provided with slanted cutting elements 44 spaced parallel to one another about the revolver in a helical formation. As shown in FIG. 4 the cutting elements are set angularly in slots formed in the risers described in connection with the principal embodiment. The outer ends of the blades are sharpened and provide a more or less conventional shearing action on the fabric fibres as compared to the lopping action provided by the hook type cutters of FIG. 1. As before, an air jet device 46 is located adjacent the shearing revolver and a cloth rest 48 in order to raise the fibres into a shearing position along the shearing line at the crest of the rest.

It will be understood that the invention described herein provides a simple yet effective apparatus for shearing fabrics to a uniform height without the need of a ledger knife. By eliminating the ledger knife, it is no longer necessary to provide the usual maintenance service such as sharpening and oiling the knife. Also, by eliminating lubrication requirements, there is no risk of oil spotting the fabric. The air jet and air draft revolver combine to raise substantially all of the fibres along the shearing line into a shearing position. The employment of the hook type cutters provides an eeffctive scythe-like shearing action without the need of a ledger knife. The hook type cutters also provide a much simpler shearing revolver in that the cutting elements may be quickly and easily mounted or replaced as compared with conventional revolvers in which each blade must be individually swaged or soldered into position. With conventional revolvers, the shearing blades are normally pre-formed into a helical configuration and heat treated prior to assembly. Such an arrangement is, of course, time consuming and expensive and the replacement of one or more cutting elements is a very precise and tedious job. Furthermore, the swaging of conventional type blades places a practical limit on the number of times a new set of blades may be applied to a revolver. With the present rib and strip assembly, the blades may be cut from a straight length of pre-sharpened high speed steel and mounted by screws of the like to the ribs. Thus, replacement of individual cutting elements is a very simple matter and may be carried out quickly, easily and at low cost.

While the invention has been described with particular reference to the illustrated embodiments, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

Apparatus for knifeless shearing of fibres on the surface of a moving fabric web, comprising in combination
    (a) a cloth rest formed with an acute angular portion over which said web is moved,
    (b) adjustable air jet means including a pair of independently rotatably mounted longitudinally slit tubes extending one within the other in telescoped relation adjacent said rest for directing a sheet of compressed air tangentially against the surface of said fabric to raise the fibres therein as the web is moved over the angular portion of said rest, adjustment of the air flow from the jet means being affected by rotation of one tube with respect to the other,
    (c) an air-draft revolver rotatably mounted in closely spaced relation to the angular portion of said rest,
    (d) a plurality of cutting elements mounted helically about said revolver for shearing said fibres raised by said compressed air flow and by said air-draft revolver,
    (e) said cutting elements comprising the sole fiber shearing elements in said apparatus,
    (f) each of said cutting elements comprising a fixed rib mounted helically about the outer surface of said revolver and extending substantially the full length thereof, a detachable strip mounted lengthwise to the outer face of said rib and in a plane generally tangential to said revolver, the leading edge of said strip being sharp to shear the raised fibers.

(References on following page)

References Cited

UNITED STATES PATENTS

| | | | |
|---|---|---|---|
| 131 | 2/1837 | Johnson | 26—15 |
| 1,049,232 | 12/1912 | Hayes | 26—15 |
| 1,052,934 | 2/1913 | Mallory | 26—15 |
| 1,139,609 | 5/1915 | Weaver | 26—15 |
| 2,206,243 | 7/1940 | Turano | 26—15 |
| 2,606,355 | 8/1952 | Richardson | 26—15 |
| 3,008,212 | 11/1961 | Hadley | 26—15 |
| 3,225,391 | 12/1965 | Whitehurst | 19—98 |

FOREIGN PATENTS

| | | |
|---|---|---|
| 499,739 | 11/1919 | France. |
| 25,730 | of 1910 | Great Britain. |

ROBERT R. MACKEY, *Primary Examiner.*